3,027,780
TRANSMISSION

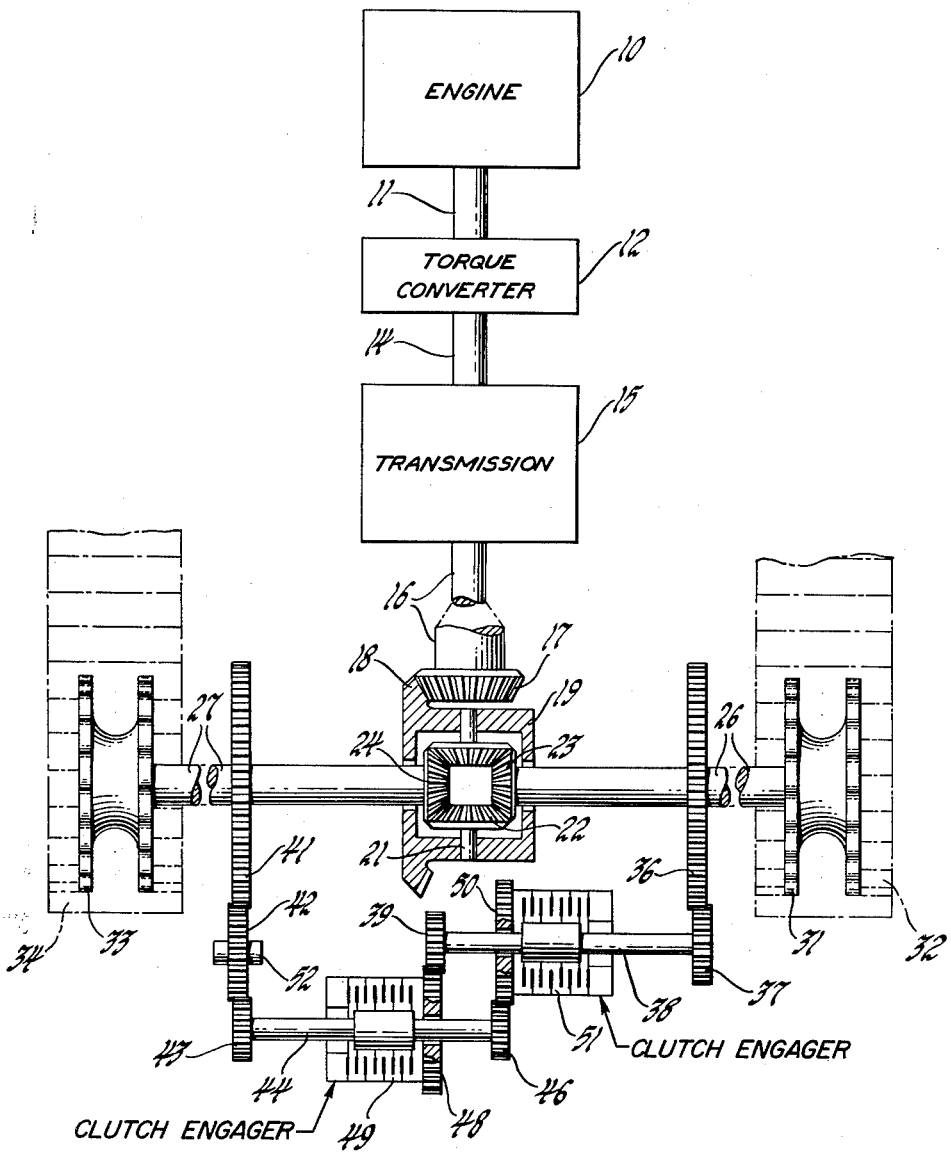

John E. Storer, Jr., and William G. Livezey, Indianapolis, Ind., assignors to General Motors Corporation, Detroit, Mich., a corporation of Delaware
Filed June 22, 1960, Ser. No. 37,941
12 Claims. (Cl. 74—710)

This invention relates to a cross drive transmission having steering clutches.

Differential cross drive steering transmission connect the power plant through a differential to differentially drive the right and left output or propulsion shafts for normal straight forward drive. The differential mechanism divides the input between both the right and left propulsion shafts during drive. In order to steer the vehicle the speed of one propulsion shaft is retarded while the speed of the other propulsion shaft is increased. In accordance with the present invention, the speed control gear on the engagement of one clutch connects the right propulsion shaft to the left propulsion shaft at a speed multiplying ratio and on engagement of the other clutch connects the left propulsion shaft to the right propulsion shaft at a speed multiplying ratio. This is done by a simplified gearing arrangement employing a right countershaft and a left countershaft, one being directly geared and the other being reversely geared to its respective propulsion shaft. Each of the countershafts has a fixed gear at the end which meshes with a gear concentric with the other countershaft and connectable to the countershaft about which it rotates by a clutch.

An object of the invention is to provide in a cross drive transmission a steering control gearing connecting the right and left propulsion shafts including a pair of countershafts geared to the respective propulsion shafts with each countershaft having a gear fixed to the countershaft and continuously meshing with a gear concentrically mounted for rotation about the other countershaft and a clutch for connecting the second gear to the other countershaft.

Another object of the invention is to provide in a cross drive transmission a simplified and sturdy gearing arrangements for steering.

Another object of the invention is to provide in a differential cross drive transmission steering control gearing having right and left duplicate parts.

These and other objects of the invention will be more apparent from the following description and drawing of the preferred embodiment of the invention.

The drawing diagramatically shows the power plant and transmission gearing arrangement.

The invention is illustrated in a vehicle drive assembly having an engine 10 which drives through a shaft 11, a transmission assembly consisting of a torque converter 12 connected through an intermediate shaft 14 to a transmission assembly 15. The transmission unit provides conventional converter torque multiplication drive and multiratio gear unit torque multiplication drive to the output shaft 16.

The output shaft 16 is connected through the bevel gear 17 and the bevel gear 18 on the differential carrier 19 to drive the differential carrier. A plurality of pinion shafts 21 are mounted radially on the differential carrier 19 to rotatably support pinions 22. Each of the pinions 22 is held in meshing engagement with a right output bevel gear 23 and a left output bevel gear 24 by a suitable thrust bearing not shown. The output bevel gears are respectively fixed to the right propulsion shaft 26 and the left propulsion shaft 27. The transmission output or differential input shaft 16, the right propulsion shaft 26 and the left propulsion shaft 27 are rotatably mounted in a conventional manner in bearings in the transmission housing not shown. The differential carrier 19 may be rotatably mounted in a known manner, for example, on the shafts 26—27 or the housing or the pinions 22.

Shaft 26 is connected to drive a sprocket 31 driving a track 32. The left propulsion shaft 27 is similarly shown drivingly connected to the left sprocket 33 which drives the left track 34. It will be appreciated that the right and left propulsion shafts 26 and 27 may be employed to drive any propulsion devices, such as wheels or other land type drive devices or paddle wheels or other water type drive devices.

The steer gearing is employed to over-control the normal equal division of torque and the speed of drive to both the right and left propulsion shafts to provide unequal drive to effect steering of the vehicle. The right propulsion shaft 26 is drivingly connected to the right steer drive gear 36 which meshes with a pinion 37 fixed to the right countershaft 38. The right countershaft 38 extends parallel to the shafts 26—27 and has at its other end a small pinion gear 39. The left propulsion shaft 27 is also drivingly connected to a left steer drive gear 41. The left steer drive gear 41 is connected through an idler gear 42 which is rotatably mounted in the housing by shaft 52 to drive countershaft gear 43. Gear 43 is fixed to left countershaft 44 in driving relation at all times. The countershaft 44 extends parallel to the propulsion shafts 26—27 and the right countershaft 38 and overlaps countershaft 38 and has at the other end pinion 46.

The pinion 39 which is driven from the right propulsion shaft 26 through the right countershaft rotates at a speed proportional to the right propulsion shaft and meshes with the ratio gear 48 which is rotatably mounted on the left countershaft 44. The clutch 49 concentrically mounted on shaft 44 connects the ratio gear 48 to the left countershaft 44 to affect the drive between propulsion shafts through the gear set 39—48. Similarly the pinion 46 which rotates at a speed proportional to the left propulsion shaft 27 is continuously in mesh with the ratio gear 50 which is rotatably mounted on the right countershaft 38. The ratio gear 50 may be drivingly connected with the right countershaft 38 by engaging the clutch 51 which is concentric with shaft 38. The right and left countershafts 38 and 44 are mounted in the transmission housing by suitable bearing means, not shown. The idler pinion 42 is also mounted in the transmission housing for rotation in a fixed position by a stud shaft 52. Though the gears 39 and 50 are shown in spaced relation for clarity of illustration it will be appreciated that for compactness they are preferably more closely located. It will be noted that the right and left steer gearing countershaft units are identical. It will also be appreciated that the gearing in both clutches 49—51 may be moved to either the right or left side of the vehicle for further compactness since at that point they can be located within the circumference of the differential.

The differential drive of right and left propulsion shafts 26—27 differentially proportions the torque and speed for normal straight forward driving. When it is desired to steer the vehicle to the left, the left clutch 49 is engaged by a conventional clutch engager or clutch engaging means preferably of the mechanical or hydraulic type to establish a positive drive connection between the right and left propulsion shafts 26—27. The left propulsion shaft 27 will be connected through the steer drive gear 41, idler gear 42 and gear 43 to drive the left countershaft 44 in the same direction as the left propulsion shaft 27. The clutch 49 being engaged will transmit torque from the left countershaft 44 to the ratio gear 48, to drive the pinion 39 at an increased speed. Pinion 39 will then drive through the countershaft 38, gear 37 and steer drive gear 36 the right propulsion shaft 26 at increased rate of speed and thus reduce the speed of the left propulsion shaft to steer the vehicle to the left. For right steering, the clutch 51 is engaged by a similar clutch engager to connect the right propulsion shaft 26 through the right drive gear 36 to drive gear 37. Gear 37 will thus drive the countershaft 38 which is connected by engaged clutch 51 to drive the ratio gear 50. The ratio gear 50 over-drives the pinion 46 and countershaft 44 at an increased speed. Countershaft 44 is connected through gear 43, idler gear 42 and left steer drive gear 41 to drive the left propulsion shaft 27 at an increased speed as compared to the right propulsion shaft 26 and due to the reaction to reduce the speed of the right propulsion shaft 26 to affect right steering.

The above described preferred embodiment of the invention may be modified by those skilled in the art within the scope of the appended claims.

We claim:

1. In a cross drive steering transmission, an input member, right and left propulsion shafts, a differential drive mechanism connecting said input member to said right and left propulsion shafts to provide a differential drive, a right countershaft and a left countershaft, drive means connecting one of said right and left propulsion shafts to one of said right and left countershafts to rotate said one countershaft in the same direction and connecting the other of said propulsion shafts and the other of said countershafts to rotate said other countershaft in the opposite direction, one ratio drive means mounted on both countershafts selectively operable to connect both countershafts together to increase the speed of one countershaft relative to the speed of the other countershaft, another ratio drive means mounted on both countershafts selectively operable to connect both countershafts together to decrease the speed of one countershaft relative to the speed of the other countershaft, and means to selectively engage said one and another ratio drive means.

2. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction, a pinion fixed on the end of each countershaft meshing with a ratio gear rotatably mounted on the other countershaft, and one of a pair of clutch means concentrically mounted on each countershaft selectively operable to connect one ratio gear to one countershaft on which one ratio gear and one clutch means is rotatably mounted.

3. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to roate said other countershaft in the opposite direction, a pinion fixed on the end of each countershaft, a ratio gear rotatably mounted on each countershaft meshing with the pinion on the other countershaft, and a pair of clutch means each concentrically mounted on one countershaft and being selectively operable to connect the ratio gear on the same countershaft to the countershaft on which each ratio gear is rotatably mounted.

4. In a cross drive steering transmission, an input member, right and left propulsion shafts, a differential drive mechanism connecting said input member to said right and left propulsion shafts to provide a differential drive, a right countershaft and a left countershaft positioned parallel to said right and left propulsion shafts and having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction, a pinion fixed on the end of each countershaft, a ratio gear rotatably mounted on each countershaft meshing with the pinion on the other countershaft, and a pair of clutch means each concentrically mounted on one countershaft and being selectively operable to connect the ratio gear on the same countershaft to the countershaft on which each ratio gear is rotatably mounted.

5. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction at the same proportional speed, a pinion mounted on each countershaft, a ratio gear on each countershaft meshing with the pinion on the other countershaft, means securing one of each meshing pinion and gear pair to the countershaft on which it is mounted, one clutch means selectively operable to connect the other of one meshing pinion and gear pair to the countershaft on which it is mounted, another clutch means selectively operable to connect the other of the other meshing pinion and gear pair to the countershaft on which it is mounted, and means to selectively engage said clutches.

6. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction at the same proportional speed, a pinion fixed on each countershaft, a ratio gear rotatably mounted on each countershaft meshing with the pinion on the other countershaft, one clutch means selectively operable to connect the ratio gear on said one countershaft to said one countershaft, another clutch means selectively operable to connect the ratio gear on said other countershaft to said other countershaft, and means to selectively engage said clutches.

7. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction at the same proportional speed, a pinion fixed in the end of each countershaft, a ratio gear rotatably mounted on each countershaft meshing with the pinion on the other countershaft, one clutch means concentrically mounted on one countershaft selectively operable to connect the ratio gear on said one countershaft to said one countershaft, another clutch means concentrically mounted on the other countershaft selectively operable to connect the ratio gear on said other countershaft to said other countershaft, and means to selectively engage said clutches.

8. In a cross drive steering transmission, an input member, right and left propulsion shafts, a differential drive mechanism connecting said input member to said right and left propulsion shafts to provide a differential drive, a right countershaft and a left countershaft positioned parallel to said right and left propulsion shafts and having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction at the same proportional speed, a pinion fixed on the end of each countershaft, a ratio gear rotatably mounted on each countershaft meshing with the pinion on the other countershaft, one clutch means concentrically mounted on one countershaft selectively operable to connect the ratio gear on said one countershaft to said one countershaft, another clutch means concentrically mounted on the other countershaft selectively operable to connect the ratio gear on said other countershaft to said other countershaft, and means to selectively engage said clutches.

9. In a cross drive steering transmission, an input member, right and left propulsion shafts, a differential drive mechanism connecting said input member to said right and left propulsion shafts to provide a differential drive, a right countershaft and a left countershaft, drive means connecting one of said right and left propulsion shafts to one of said right and left countershafts to rotate said one countershaft in the same direction and connecting the other of said propulsion shafts and the other of said countershafts to rotate said other countershaft in the opposite direction, one ratio drive means mounted on both countershafts selectively operable to connect both countershafts together to increase the speed of one countershaft relative to the speed of the other countershaft, and another ratio drive means mounted on both countershafts selectively operable to connect both countershafts together to decrease the speed of one countershaft relative to the speed of the other countershaft.

10. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction, a pinion fixed on the end of each countershaft meshing with a ratio gear rotatably mounted on the other countershaft, and one of a pair of clutch means concentrically mounted on each countershaft to connect one ratio gear to one countershaft on which one ratio gear and one clutch means is rotatably mounted.

11. In a cross drive steering transmission, an input member, right and left propulsion shafts, a differential drive mechanism connecting said input member to said right and left propulsion shafts to provide a differential drive, a right countershaft and a left countershaft positioned parallel to said right and left propulsion shafts and having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction, a pinion fixed on the end of each countershaft, a ratio gear rotatably mounted on each countershaft meshing with the pinion on the other countershaft, and a pair of clutch means each concentrically mounted on one countershaft to connect the ratio gear on the same countershaft to the countershaft on which each ratio gear is rotatably mounted.

12. In a cross drive steering transmission, an input member, right and left propulsion shafts, a differential drive mechanism connecting said input member to said right and left propulsion shafts to provide a differential drive, a right countershaft and a left countershaft having the adjacent ends of said countershafts in overlapping relationship, drive means connecting one of said right and left propulsion shafts to one of said right and left countershafts to rotate said one countershaft in the same direction and connecting the other of said propulsion shafts and the other of said countershafts to rotate said other countershaft in the opposite direction at the same proportional speed, a pinion mounted on each countershaft, a ratio gear on each countershaft meshing with the pinion on the other countershaft, means securing one of each meshing pinion and gear pair to the countershaft on which it is mounted, one clutch means selectively operable to connect the other of one meshing pinion and gear pair to the countershaft on which it is mounted, and another clutch means selectively operable to connect the other of the other meshing pinion and gear pair to the countershaft on which it is mounted.

References Cited in the file of this patent

UNITED STATES PATENTS

| | | |
|---|---|---|
| 2,389,498 | Gates | Nov. 20, 1945 |
| 2,874,790 | Hennessey | Feb. 24, 1959 |